Jan. 23, 1962     R. R. GRINSTEAD     3,018,253
PROCESS FOR PRODUCING ALKYL ORTHOPHOSPHORIC ACID EXTRACTANTS
Original Filed June 29, 1956     5 Sheets-Sheet 1

INVENTOR.
ROBERT R. GRINSTEAD
BY
ATTORNEY.

ns of solids. ## United States Patent Office 3,018,253
Patented Jan. 23, 1962

3,018,253
PROCESS FOR PRODUCING ALKYL ORTHOPHOSPHORIC ACID EXTRACTANTS
Robert R. Grinstead, Concord, Calif., assignor, by mesne assignments, to the United States of America as represented by the United States Atomic Energy Commission
Original application June 29, 1956, Ser. No. 595,034, now Patent No. 2,860,031, dated Nov. 11, 1958. Divided and this application Sept. 16, 1958, Ser. No. 761,445
10 Claims. (Cl. 252—364)

This invention relates to solvent extraction and leaching processes for recovering and purifying metals and, more particularly, to superior extractants for use in processes for recovering and purifying various metals. This application is a division of my copending application Serial No. 595,034, filed June 29, 1956 now U.S. Patent No. 2,860,031, issued November 11, 1958.

Certain alkyl phosphatic derivatives, i.e., alkyl pyrophosphoric, alkyl o-phosphoric, alkyl phosphonic, and alkyl phosphinic acids, have been employed for recovering uranium and other metal values from mineral acid solutions, solids and slurried admixtures of solids as disclosed in the copending applications of Richard H. Bailes and Ray S. Long, Serial No. 335,276, filed February 3, 1953, for Solvent Extraction Process for the Recovery of Metals from Phosphoric Acid now U.S. Patent No. 2,859,092 issued November 4, 1958; Ray S. Long, Serial No. 491,798, filed March 2, 1955, for Alkyl Pyrophosphate Metal Solvent Extractants and Process now U.S. Patent No. 2,866,680, issued December 30, 1958; Ray S. Long, Serial No. 502,253, filed April 18, 1955, for Process for the Recovery of Uranium from Phosphatic Ore now U.S. Patent No. 2,882,123, issued April 14, 1959; Robert R. Grinstead, Serial No. 527,428, filed August 9, 1955, for Slurry Solvent Extraction Process for the Recovery of Metals from Solid Materials now U.S. Patent No. 2,869,979, issued January 20, 1959; and Robert R. Grinstead, Serial No. 527,429, filed August 9, 1955, for Process for the Recovery of Metals from High-Lime Carnotite Ores now U.S. Patent No. 2,869,980, issued January 20, 1959. An improved method for the preparation of the above-mentioned alkyl pyrophosphate extractants is also disclosed in the copending application of Charles A. Levine and William E. Skiens, Serial No. 580,670, filed April 25, 1956, for Preparation of Alkyl Pyrophosphate Extractants, now U.S. Patent No. 2,885,888.

Now it has been discovered that superior results may be obtained in solvent extraction processes for the recovery of metals from a great variety of acidic or neutral mineral acid solutions, aqueous slurries, non-aqueous slurries and solid leaching processes of the character disclosed in the aforesaid applications. These highly advantageous results are obtained by employing therein extractants or leaching agents of a special class of organic orthophosphates, more particularly, certain mono- and di-alkyl esters of orthophosphoric acid. These new extractants show greater selectivity and more efficient extraction or leaching of highly valued or strategic metals, e.g., uranium, vanadium, and others from a wide variety of ores and under highly diverse extraction conditions.

It is therefore an object of the invention to provide improved extractants for use in solvent extraction and leaching processes for recovering and purifying metal values.

Another object of the invention is to provide a process wherein an extractant phase comprising a superior alkyl orthophosphoric acid ester in admixture with an organic solvent-diluent is employed to extract or leach metal values from acidic or neutral solutions, aqueous and non-aqueous slurries and solids.

Still another object of the invention is to provide a process wherein an extractant phase comprising a superior alkyl orthophosphate in admixture with an organic solvent-diluent is employed to extract or leach metal values from acidic or neutral solutions, aqueous and non-aqueous slurries and solids, wherein the metal value is recovered from the extractant phase.

A further object of the invention is to provide a process for preferentially extracting or leaching metal values including lanthanides, actinides and others from acidic or neutral solutions, aqueous and non-aqueous slurries and solids with a superior alkyl orthophosphate in admixture with an organic solvent-diluent.

A still further object of the invention is to employ mono- and di-alkyl esters wherein the alkyl derivatives are from nine to seventeen carbon atoms in length and the —OH functional group of the alcohol used in the synthesis thereof is not attached to a terminal carbon atom, and the carbon atom to which the —OH group is attached is not necessarily a secondary carbon atom as extractants in solvent extraction and leaching processes for recovering and purifying metal values.

Other objects and advantages of the invention will become apparent by consideration of the following description taken in conjunction with the accompanying drawings, of which:

Figure 1:
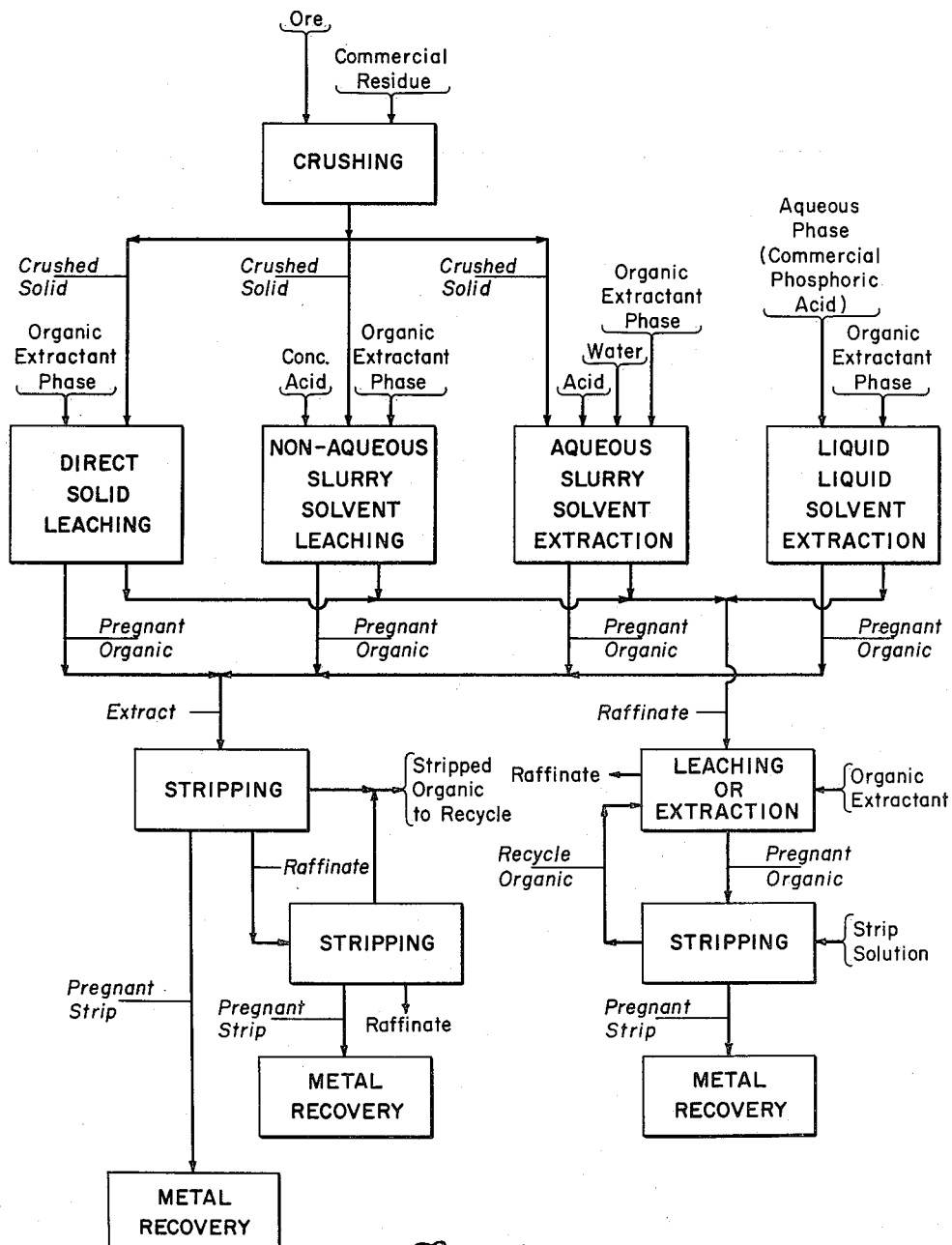
FIGURE 1 is a flow sheet illustrating the process of the invention.

The present invention contemplates the utilization of certain superior mono- and di-alkyl o-phosphoric acid extractants in processes of the general character disclosed in the aforesaid applications. Such processes utilize a variety of alkyl phosphatic extractants for the leaching or extraction of a variety of metals from neutral or acidic solutions, aqueous slurries, non-aqueous slurries and solids. When utilized in such or similar types of processes, greatly improved selectivity, high extractability under certain conditions and other advantages are obtained resulting in improved operation of the processes and permitting advantageous modification in various operations thereof. Thereby more economical operation is permitted and higher recoveries and purer products are obtained.

In general the processes of the invention concern the extraction or leaching of certain classes of metal values from various acidic and neutral solutions, solids, acidic aqueous slurries of solids and acidified non-aqueous slurries of solids by contact with an extractant phase comprising a superior alkyl o-phosphoric acid ester and a solvent-diluent. After separation of the phases, the desired metal value is recovered from the extract phases by methods similar to those disclosed in the foregoing applications and others disclosed more fully hereinafter. Mineral acids including sulfuric, hydrochloric, nitric, phosphoric and other reagents including oxidizing and reducing agents are employed in conjunction with the extractant phase in various ways to enhance or depress the selectivity and/or extractability of desired materials or impurities.

As employed herein the term "leaching" is intended to indicate that a fluid phase, either an aqueous phase or an extractant phase, is employed to effect direct removal of a metal value from a solid substance. Extraction is intended to indicate the removal of a metal value from a fluid phase by contact with an immiscible organic extractant phase, i.e., liquid-liquid extraction. The operations of the invention involve two additional situations as follows:

(1) The leaching of the metal value from a solid by contact with an extractant phase in the presence of essentially non-aqueous reagents, i.e., non-aqueous slurry solvent leaching.

(2) The leaching or extraction of a metal value from a solid by contact with an extractant phase in the presence of an aqueous phase, i.e., aqueous slurry solvent extraction.

The superior orthophosphate extractants of the invention may be presented generally by the formulas:

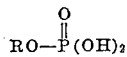

and

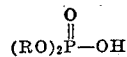

wherein R can be aliphatic chain substituents, i.e., orthophosphoric acid esters of aliphatic alcohols, similar to the lower molecular weight derivatives disclosed in application S.N. 335,276, ibid. However, in practice, it has been found that the mono- and di-substituted orthophosphate derivatives of certain branched chain aliphatic alcohols, which are further defined as having the —OH functional group attached to a carbon atom situated inward of the terminal carbon atoms and having at least nine and as many as seventeen carbon atoms therein, behave quite differently in certain important properties from those disclosed previously. Mono- and di-alkyl esters of orthophosphoric acid derived from 2,6-dimethyl heptanol-4 (commonly called diisobutyl carbinol or nonanol), 2,6,8-trimethyl nonanol-4 (dodecanol), 2-methyl 7-ethyl decanol-4 (tridecanol), 2-methyl-7-ethyl undecanol-4 (tetradecanol), and 3,9-diethyl-tridecanol-6 (heptadecanol) are representative examples of the extractants found especially advantageous in the process of the invention. To facilitate and simplify the description, the abbreviations NPA, DDPA, and HDPA will represent nonyl orthophosphoric acid, dodecyl orthophosphoric acid, and heptadecyl orthophosphoric acid, respectively, as specified above. Unless context indicates otherwise, when referring to the extractants of the invention, a mixture of both the mono- and di-alkyl substituted orthophosphate is inteded. It is considered that other extractions may be derived in accordance with the invention from alcohols other than those specified above by selection in accordance with said further definition. Other alkyl derivatives including alicyclics of the indicated chain length as well as mixed derivatives may also be found suitable provided solubility in the aqueous phase is low, solubility is good in the organic solvent-diluent, and excessive emulsification or other troublesome phenomena do not occur. The nonyl, dodecyl, and heptadecyl orthophosphate derivatives have been most extensively employed; however, since these materials are representative of the substituents of chain lengths in the range of nine to seventeen carbon atoms at least the intervening materials are considered to yield generally comparable extraction results. A preferred method for preparing such extractants is described more fully hereinafter.

Kerosene, Stoddard solvents and isopropyl ether have been found to be excellent solvents for use as a diluent with the alkyl orthophosphate ester extractants of the invention. However, many other materials are satisfactory including aliphatic hydrocarbons, aromatic hydrocarbons, halogenated hydrocarbons, ethers, and petroleum derived materials such as diesel oil, aromatic oils, distillates, various commercial organic solvents, gasoline and petroleum ethers with the selection of any particular solvent being made generally on the basis of economic considerations. In view of the diverse nature of the aforementioned solvents, it will be apparent that materials other than those specified will also be found suitable. Generally speaking, the characteristics of the solvent-diluent are not critical, although particular solvents will be found to possess advantages under certain conditions. The minimum requirements are that the solvent be insoluble in the phases contacted therewith, the extractant must be soluble therein and the extractant-metal value compound be soluble therein.

The extractant phases of the invention exhibit a characteristic behavior in either leaching or extraction operations. This behavior is similar in many respects to the alkyl phosphatic extractants disclosed in the foregoing applications; however, they also differ in certain very important respects. Monovalent and divalent ions, such as $Na^+$, $K^+$, $Ca^{++}$, $Mg^{++}$, $Fe^{++}$, etc., usually are not extracted to an appreciable extent. Trivalent ions such as $Fe^{+++}$, $Ti^{+++}$ and those of the lanthanide and actinide series are extractable with appreciable efficiency with the exception that $Al^{+++}$ is extracted with a considerably lowered efficiency compared with the other alkyl phosphatic extractants described above. Polyvalent ions such as $Th^{+4}$, $U^{+4}$ and other ions of the lanthanide and actinide series, which are at least tripositively ionized, are extracted with the highest efficiencies and it may be noted that the higher charged vanadium ions, i.e., those of the +4 and +5 oxidation state, although in the divalent and monovalent ionic states, respectively, are extracted with high efficiency as compared with other alkyl phosphatic extractants. Dipositive ions of a higher oxidation state such as uranyl, $UO_2^{++}$, anomalously, are extracted with excellent efficiency. By utilizing this difference in affinity for variously charged ions, the extractions of the invention are able to extract very small quantities of the desired metal values away from large quantities of matrix and impurity materials.

In general, it may therefore be stated that the various metallic ions can be arranged into series with reference to the extractability into or affinity for the extractant phase relative to the affinity for a fluid or solid phase. By appropriately adjusting the oxidation state and thereby the relative degree of ionization of the ions in the system, in accordance with the above rules, extraction of a desired material may be favored and extraction of an impurity repressed or vice versa. Moreover, extraction generally increases with increase in extractant concentration, ratio of extractant to aqueous phases and decrease in the concentration of mineral acid in the aqueous phase, inter alia.

The utilization of solvent extractant phases prepared of the foregoing extractants and solvents for the extraction of metal values by various leaching and extraction processes will now be set forth.

LIQUID-LIQUID EXTRACTION

More particularly, with reference to the flow diagram of FIG. 1 of the drawing, metal values are extracted from aqueous solutions by contact with an extractant phase comprising a solvent-diluent and an alkyl o-phosphoric acid ester of the character described hereinbefore. Such solutions can be obtained by any suitable means such as the treatment of ores with leaching acid, dissolution of any solid material in any of the mentioned mineral acids, appropriate acidification of solutions already formed by various other means such as basic leachings of an ore—or the solution may be obtained in an intermediate stage of manufacture of other materials. The essential requirement is that the metal value be available in the solution in a positively ionized or multivalent complex state as indicated hereinafter. Further, since alkaline solutions tend to react with the extractants of the invention resulting in their inactivation, it will generally be essential to employ acidic, acidified or neutral solutions. In any case, it will be understood that when aqueous solutions are employed in the invention, acidic or neutral solutions containing the metal values are first produced.

The extractants of the invention are particularly useful for the recovery and purification of lanthanide and actinide elements. Accordingly, solutions thereof in the above-indicated mineral acids are produced in any appropriate manner. Illustratively, uranium occurs in phosphatic ores and other materials associated therewith. Commercial phosphoric acid is produced therefrom by treatment, e.g., with sulfuric acid whereupon various lanthanides and actinides (thorium and uranium) together with vanadium appear in the commercial phosphoric acid. Similar acidic phosphatic leach solutions can be obtained with other of the specified acids. Numerous impurities including, e.g., sulfate, ferrous and ferric iron, aluminum, floride, and silicious materials may also appear in the solution dependent on the presence thereof in the source material.

Uranium ordinarily occurs in such commercial phosphoric acids in the hexavalent or uranyl state while iron occurs in the ferric state. While uranyl ions can be extracted from less concentrated phosphoric acids with reasonable efficiency, in more concentrated acids, i.e., above about 20–30% $P_2O_5$, extraction falls off; moreover, ferric iron is also extracted to a considerable degree and constitutes an impurity along with $Ti^{++++}$ if present. Due to some unexplained phenomenon, aluminum is extracted to only a limited degree by the extractants of the invention and thereby an important purification is achieved and process difficulties in later stages are avoided. To improve the extraction of the uranium and repress extraction of iron, the acidic solution is treated with a reducing agent to place the uranium in the more easily extracted uranous state and the iron in the less extractable ferrous state. This principle is likewise applicable to other materials as indicated above.

Iron, aluminum and zinc metals, sodium thiosulfate, titanium trichloride and others are satisfactory reducing agents for treating the feed solutions. Preferably, iron is employed in a particulate form disposed in a column through which the solution is passed, in the absence of oxygen. Consumption of iron is reduced and the efficiency of the reduction increased if the iron is first washed with dilute HCl. A convenient method for determining the oxidation state of the feed solution, i.e., the mass equilibrium oxidation state of all the dissolved materials, is to measure the oxidation potential developed between a Pt and a standard calomel electrode (S.C.E.) immersed in the solution.

For use in liquid-liquid extractions, concentrations of extractant in the diluent can range from about 0.05% to pure extractant insofar as occurrence of extraction phenomena alone is concerned. However, from the standpoint of practical operations, concentrations in the range of about 0.05 to 5 molar solutions represent reasonable operating limits and are therefore preferred. With high concentrations of the extractants in the diluent or pure extractant, the high viscosity of the extractant phase makes handling and contacting operations difficult, if not impossible. Also, losses of extractant into the extracted phase become exorbitant and entrainment may cause poor metal recoveries. Other advantages are also obtained and difficulties eliminated through the use of the diluent.

When performing the actual extraction, any suitable method of contacting the extractant and extracted phases may be employed. Phase ratios in the range of about 1:1 to 20:1, extracted to extractant, phases are usually satisfactory. It will be appreciated that concentrations of the extractant in the organic phase and the phase ratio are interrelated and that the particular choice of values for these variables will depend on a variety of factors including solubilities of the relevant materials, losses, recovery level desired, etc. In any case the metal value is extracted from the feed material in processing equipment which is conventional in the art. Such systems may be adapted for simple phase equilibrations, countercurrent extraction, continuous mixer-settler systems, pulsed column extraction and other systems amenable to the efficient contact and separation of immiscible fluid phases.

Particular extractants of lower extracting efficiency than others herein contemplated can be efficiently utilized in the process of the invention by employing multi-contacting systems, recycle systems, and combinations thereof, thus raising the effective extracting efficiencies of said extractants. Such lower efficiency extractants are especially useful in such systems when, as is often the case, their solubilities in the feed material phase are low and their subsequent low loss in the discard phase makes their use economically attractive. Thus, an optimized selection of the extractant from the series of extractants contemplated herein must be based primarily on extraction efficiency, but may be modified somewhat by factors such as mutual solubilities, cost of preparation, emulsion tendencies, nature of the feed material, and the like.

In describing and evaluating the results of the process, certain terms relating to process analysis will appear hereafter. Such terms are as follows:

The distribution coefficient usually can be only approximately determined from the results of a single equilibration—as analyses may not be performed with the required degree of precision. Such coefficient is more accurately ascertained by plotting the results from a number of experiments at different phase ratios and measuring the slope of the resulting isotherm curve. The isotherm is obtained by plotting $C_O$ vs. $C_A$, where $C_O$ is the concentration of metal value in the organic phase, and $C_A$ is the metal value concentration in the aqueous phase. The slope of the curve resulting in the above plot is denoted $K_D$, or the distribution coefficient. In the case where the isotherm (plot of $C_O$ vs. $C_A$) is linear, $K_D$ is independent of volume ratio and is therefore a valid criterion of the magnitude of the extraction. However, most actual cases are found to be concave toward the $C_A$ axis and not linear. This nonlinearity results from the approach to saturation of a given organic phase by the metal value it is extracting.

The magnitude of the extraction is also indicated as the percentage of metal value extracted. Said percentage is calculated from the expression:

$$\text{Percent extracted} = 100\left(1 - \frac{C_A}{C_H}\right)$$

where $C_A$ is the concentration of metal value in the final extracted phase, and $C_H$ is the concentration of metal value in the feed or head material. Percentage extracted is similarly a function of the ratio of the organic and aqueous phases; since for conservation of mass $$C_A = C_F - \frac{C_O V_O}{V_A}$$

where $C_A$ is the metal concentration in the extracted or aqueous phase, $C_F$ is the metal concentration in the head or feed material, $C_O$ is the concentration of extracted metal in the organic phase, $V_O$ is the volume of organic phase and $V_A$ is the volume of the extracted or aqueous phase; and thus valid comparisons of extractions performed under different conditions are obtainable only by comparing the curves derived from a plot of percentage extracted against the volume ratios.

Leach solutions obtained from various other ores, e.g., primary and secondary uranium ores, etc., and with other of the indicated mineral acids can be treated for the recovery of individual materials as indicated hereinbefore. However, in the event that several desired materials occur in the leach solution, for example uranium, thorium, vanadium, and/or lanthanide rare earths, other advantageous modes of operation are permitted utilizing the aforesaid information regarding differences in extractability due to oxidation state, regulating the concentration of extractants and extraction conditions in various successive operations to selectively extract the desired materials and others apparent in the description. Likewise, selective stripping of the extract phase or other selective metal recovery methods may then be employed to effect additional separation or purification.

In general, by applying the above principles, i.e., with the proper manipulation of the sequence of operations and conditions in the process of the invention, highly desired metal values may be separated one from the other or impurities. The small differences in the extraction coefficient of the extractant toward the highly charged metallic ions may be used to advantage in such a manner that while several metal ions are extracted together into the extractant phase they may be selectively stripped therefrom by the use of stripping solutions of graded extractive power. Or, in other instances, metal values may be separated by the proper selection of extractant solutions, wherein the feed containing the mixed metal values is extracted first with an extractant solution of low relative extractive power and the raffinate therefrom is subsequently extracted with a second extractant solution of a relatively greater extractive power. Other modifications of the sequence of operations are also possible. In such a process, by the proper selection of extractant or extraction conditions, one desired metal value (e.g., uranium) will be extracted into the first solution and another metal value (e.g., vanadium) extracted into the second solution. The metal values may then be stripped separately from their respective extractant phases. Further details of a specific application of such principles in accord with the invention will be apparent in examples set forth hereinafter.

As a result of the foregoing operations, there is finally obtained an extract phase containing the desired metal value, which may be recovered therefrom by methods described hereinafter, or an aqueous strip solution containing the desired metal value, which can also be treated for the recovery of the metal value.

DIRECT LEACHING OF SOLIDS

The extractants of the invention can also be employed for the direct leaching of metal values from solid materials in a manner analogous to that disclosed in the aforesaid application S.N. 502,253. Superphosphate, produced from uraniferous phosphate rock, contains a small amount of uranium which can be recovered by the foregoing method. However, such a solid material containing the desired metal value may be produced in a variety of ways, e.g., such solid may be a normal commercial product, a solid which is produced incidental to various industrial operations, a material primarily intended for some other purpose and incidentally containtaining the desired metal, or it may be a solid produced with the intention of recovering the desired metal value directly therefrom. Under some circumstances the production of the original solid material may require only a physical treatment such as grinding to a suitable size, roasting, etc. In other circumstances, the solid may be formed by dehydrating leach solutions of various sorts or may result from the direct treatment of the ore with various reagents, such as oxidizing agents, mineral acids, etc., to provide a dry product in which the desired metal value is in a state which is favorable for extraction.

The solid, e.g., superphosphate, produced by the reaction of sulfuric acid on phosphatic rock in a conventional manner or with a small amount of nitric acid added during manufacture to improve recovery, is contacted with an extractant phase comprising a solvent-diluent and an extractant of the invention. Extractant concentrations of from about 1% to 25% by weight are generally satisfactory for recovering above-indicated metal values, especially U, V, Th, and lanthanides using phase ratios of about 1:1 to 4:1 (organic volume ml./g. solid). Ordinarily, enough fluid phase is employed to wet the solid and short contact times (few minutes minimum) are employed.

Separation of the extract from the solid is effected by conventional filtration or centrifugation and washing with additional solvent. There is finally obtained an extract containing uranium or other metal value, from which the metal value is recovered as described more fully hereinafter.

AQUEOUS SLURRY SOLVENT EXTRACTION

In the recovery of metal values from certain solids, e.g., uranium, thorium, vanadium, lanthanides, etc., the solid is comminuted and the metal values are leached with an aqueous phase; however, separation of the aqueous phase from the solid is often very difficult. The difficulty can be overcome by employing solvent extraction directly from the slurry thereby eliminating the troublesome filtration operation as disclosed in the aforesaid application S.N. 502,253.

Advantages are obtained in such a process by employing an extractant phase including an extractant of the present invention. Operations as employed in the recovery of uranium and vanadium from ores and especially low-grade ores exemplify this mode of operation. The solid containing the metal value, e.g., carnotite, shales, and other primary or secondary ores are usually ground and then mixed with an aqueous phase containing a mineral acid and oxidizing or reducing agents to leach the mineral value therefrom and place the metal value in an oxidation state which is favorable for extraction. Simultaneously, or subsequently, the aqueous slurry is contacted, with agitation, with an extractant phase comprising a solvent-diluent and an extractant of the invention. With uranium ores sulfuric acid is preferred as the solubilizing acid although nitric and hydrochloric may also be employed. Ordinarily, the acid is employed in at least stoichiometric equivalents to all of the reactable materials in the slurry and a discrete aqueous phase is formed, i.e., about 10 to above 50% solids content, by volume.

Concentrations of the extractant may range from about 1% to above 30% by weight and phase ratios of the order of 0.2 to 10, organic volume/aqueous volume may be employed. Contact times of a few minutes for small scale operations and up to about ½ hour for large scale operations are usually sufficient for high recovery. Adjustment of the oxidation state of the leached metals as indicated above facilitates recovery; however, increased extractant concentrations, improved contact procedures, and the like also can be used to raise the recovery to the desired level.

Separation of the phases may be simply performed by allowing separation to occur on standing and then decanting the extract phase. Phase separation is accelerated by blowing finely dispersed air bubbles through the mixture or by adding additional solvent so as to obtain phase inversion. The present extractant phases separate at accelerated rates.

Finally there is obtained an extract from which the desired metal value, especially uranium, thorium, vanadium, lanthanides and other actinides, can be recovered as described more fully hereinafter.

NONAQUEOUS SLURRY SOLVENT LEACHING PROCESS

For the recovery of metal values from high-lime materials, e.g., high-lime carnotite ores, it is advantageous to employ alkyl phosphatic extractant phases under so-called "nonaqueous" slurry conditions as disclosed in the aforesaid application S.N. 527,429. Additional benefits are derived by employing the extractants of the present invention in extract which are otherwise of an analogous character.

More particularly, high-lime carnotite ores or a similar dry material is comminuted by conventional means to a particle size appropriate to form a slurry. Low moisture content mineral acid solubilizing agents and an extractant phase comprising a solvent-diluent and an extractant of the present invention are then admixed with the solid to form a "nonaqueous" slurry therewith, whereby the extractant phase selectively extracts uranium, vanadium, thorium and lanthanide elements with the assistance of the solubilizing agent. The slurry need not be completely anhydrous; however, the moisture content must be kept low to avoid the necessity of operating as in the preceding method.

The order of addition of the reagents is not critical; however, it is generally preferred that the acid be added either prior to or simultaneously with the extractant phase. Sulfuric acid near 100% in concentration (i.e., above about 95%) is generally the best agent; however, nitric and hydrochloric acids, in highly concentrated forms, are also effective. Ordinarily, much less than the stoichiometric amount, often only 10–30% as much, of acid is required for essentially complete metal recovery by this method as compared to the aqueous slurry and ordinary leaching processes. The present extractants gave high uranium and superior vanadium recoveries while the extraction of certain impurities, particularly aluminum, is much repressed by the present extractants.

Extractant concentrations of about 1 to 30% or more in the above-indicated solvents and solids contents of from about 10 to above 70% volumetrically are suitable. Oxidizing agents may be employed to provide a more extractable state of a particular metal or a reducing agent added to increase uranium extraction and repress iron extraction. Effective extractions are obtained with about ½ hour of contact time.

Separation of the phases can be accomplished by filtration, decantation, or centrifugation together with washing with additional solvent. There is obtained an extract from which the metal value is recovered as described more fully hereinafter.

RECOVERY FROM EXTRACT

In general the metal value may be recovered from the extract by precipitation, evaporation and stripping, or re-extraction with an aqueous phase. Solid products can be calcined or subjected to further treatment and purification to yield various commercial products as described in the aforesaid copending applications. However, certain novel stripping methods and other methods disclosed hereinafter provide advantages.

Purification of the lanthanides and actinides from the extract can be accomplished by the addition of aqueous HF when the metal value is an oxidation corresponding to an insoluble fluoride thereof. Uranium in the tetravalent state or hexavalent uranium reduced with Fe, $FeSO_4$, or $Na_2S_2O_4$ is precipitated as a uranous fluoride. Addition of concentrated $H_3PO_4$ increases the efficiency of the HF precipitation, but more phosphate then appears in the product.

Ammonia and other bases, e.g., NaOH, likewise precipitate the metal values and a phosphatic product is obtained on calcination of the precipitate. Alcohol also is capable of precipitating metal values from the extract, particularly methyl and ethyl alcohols. Apparently, the alcohol selectively extracts the extractant from the organic phase whereupon the metal value precipitates due to the disruption of the metal value-extractant compound. The precipitate can be calcined to yield a phosphatic product and the alcohol and extractant recovered for recycling. Destructive evaporation and calcination can likewise be employed yielding an impure phosphatic product.

Additional purification, selective separation, economic recovery and other advantages are obtainable utilizing re-extraction or stripping procedures to recover the metal value from the extract. Aqueous phases containing strong mineral acids, especially hydrofluoric and hydrochloric acids, or sulfuric and nitric acids listed in the order of preference, have been found satisfactory for recovering various metal values from the extract. Even weak concentrations of hydrofluoric and hydrochloric acid will strip many metal values, e.g., hexavalent uranium, from the extract; however, hydrofluoric acid in the range of 10 to 20% HF by weight and hydrochloric acid of 8 to 10 molar and higher concentrations have been found to be more practical and efficient. Solutions of sodium carbonate having concentrations above 0.3 molar also exhibit excellent stripping coefficients. The foregoing stripping methods will be described more fully hereinafter with reference to specific examples of practical operations. Certain other pyrophosphate, polyphosphate solutions, as well as acidified solutions thereof, may be used in the manner described in several of the aforesaid copending applications.

The metal values are finally recovered from the strip solution as at least a partially purified residue or precipitate, either through the boiling off of the volatile acids HCl and HF, and the subsequent volume reduction through evaporation; or by the addition of precipitation reagents, such as anhydrous ammonia or caustic soda. Also, the pregnant HCl strip solution can be passed through an anion exchange column to adsorb the desired metal value therein and then the metal value can be eluted in a purified form therefrom.

PREPARATION OF EXTRACTANTS

The organic orthophosphate ester extractants utilized in the invention are preferably prepared in accordance with the following method which yields a superior product exhibiting high and selective extraction coefficients for various metals, such as uranium and vanadium. Briefly, in preparing the extractants of the invention, phosphorus pentoxide is slurried with an organic diluent, e.g., kerosene, and then an appropriate alcohol is reacted with the slurried $P_2O_5$ under critically controlled conditions to produce an intermediate alkyl pyrophosphate ester. The pyrophosphate ester intermediate, still in admixture with the diluent, is subsequently hydrolyzed with dilute acid to form the desired organic orthophosphoric acid ester. Upon completion of the hydrolysis, the organic phase is separated from the hydrolyzing acid phase, optionally diluted with additional organic solvent, and then immediately utilized for the extraction processes as set forth herein. If not immediately employed, said extractant solution should be refrigerated; whereby it retains the superior effectiveness for a more extended period of time. The procedure employed to produce the pyrophosphate intermediate is that disclosed in the aforesaid application of Levine and Skiens; however, pyrophosphate esters obtained by other methods may also be converted into alkyl o-phosphoric acid esters in the hydrolysis operation of the invention.

Figure 2:
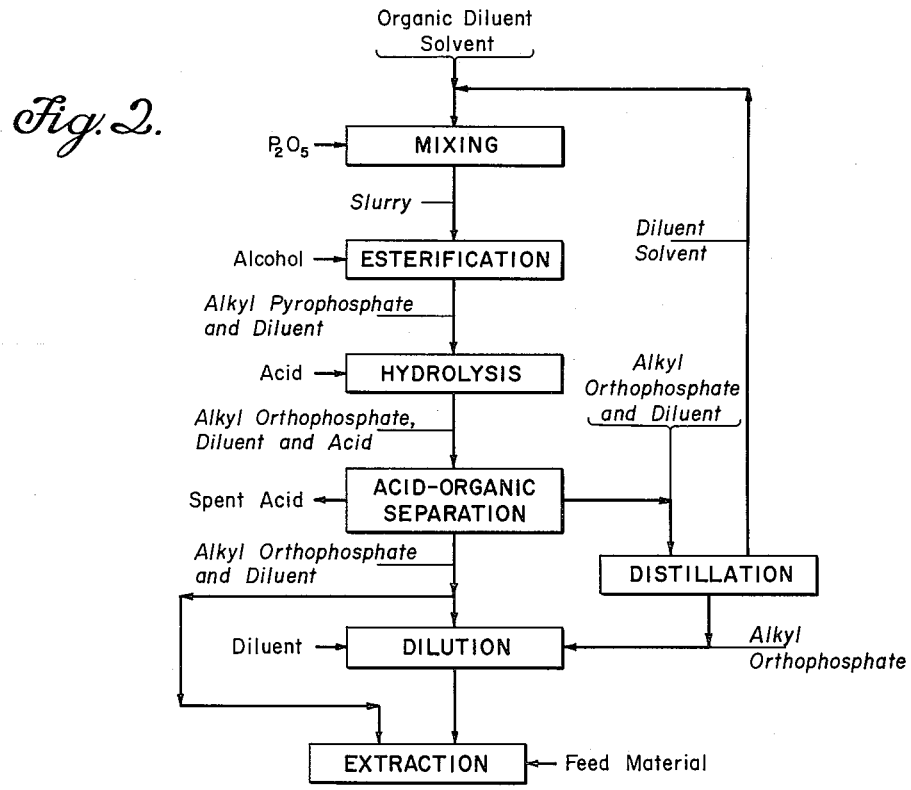
FIGURE 2 is a flow sheet illustrating the preparation of the extractants of the invention.

More specifically, for the purpose of synthesizing the alkyl orthophosphates of the invention, there is generally employed a reaction vessel which is equipped with a stirrer, reflux condenser, and means for heating and cooling. As indicated in the flow sheet of FIG. 2 of the drawing, the reaction vessel is charged with an organic solvent-diluent of the type employed for the dilution of the extractant, e.g., kerosene, benzene, isopropyl ether. Phosphorus pentoxide is introduced into the solvent and thoroughly dispersed therein, forming a $P_2O_5$ organic solvent-diluent slurry. Best results are obtained if the relative proportion of materials in the slurry correspond to about 100 gms. of $P_2O_5$ to 1 liter of solvent. With continuous stirring, the appropriate alcohol is rapidly added to the slurry in the fairly exact ratio of 2 moles alcohol to 1 mole $P_2O_5$, whereupon the reaction proceeds with a large exothermic production of heat. The temperature is maintained below a maximum of about 60° C. to insure the production of the better extractant intermediate. Either refluxing of the solvent or vessel cooling is employed to control the temperature as indicated. The resultant alkyl pyrophosphate intermediate is then hydrolyzed by the addition of a dilute acid, preferably 1 N hydrochloric acid. The acid is added to the reaction vessel in a volume equal to the volume of the initial reaction product. Heat is supplied to the vessel and the hydrolysis proceeds with the use of reflux condensation of the volatile components. The rate of hydrolysis is dependent upon the temperature; however, in general, the hydrolysis proceeds to completion in about 2 hours if the hydrolysis is carried out at a temperature of about 100° C. Lower hydrolysis temperatures require a correspondingly longer reaction period. Subsequent to hydrolysis the acid and organic phases are separated and the extractant phase employed as described above.

When prepared as above, the alkyl pyrophosphate intermediate is a mixture of mono- and di-substituted phosphorus esters, normally in about equimolar quantities. In the first few minutes of the hydrolysis step, the pyrophosphate molecules are split into the corresponding orthophosphate esters. However, as a consequence of the above intermediate composition, the resulting orthophosphate is a mixture of the mono- and di-substituted compounds. As the hydrolysis proceeds the di-substituted esters are gradually converted into the mono-substituted ester until, at the completion of hydrolysis, the ester is almost entirely mono-alkyl orthophosphoric acid. This mono-alkyl orthophosphoric acid is extremely stable in the presence of stripping acids or acid solutions as shown in Example XI given below. Certain of the orthophosphates of the invention exhibit a higher extraction coefficient when used in mixed composition, i.e., mono- and di-ester; in which case the hydrolysis step can be stopped before going to completion and the mixed ester utilized for extraction. Although the $K_D$ of such a mixed ester may be higher than that of the completely hydrolyzed product, it is sometimes preferred to use the completely hydrolyzed ester, i.e., mono-ester, since it is much more stable in the presence of acid stripping solutions and is therefore sometimes more economical in use.

Further details of the processes and the preparation of the extractants of the invention will become apparent in the following description of specific examples of processes and preparations operated in accordance with the invention.

EXAMPLE I

A continuous countercurrent extraction was run on Lukachukai ore leach liquor, said liquor being obtained by leaching the ore with sulfuric acid. The analysis of the leach liquor as obtained from the United States Bureau of Mines showed:

| | |
|---|---|
| $U_3O_8$ | gm./l__ 0.005 |
| Fe | gm./l__ 4.50 |
| $V_2O_5$ | gm./l__ 3.75 |
| $PO_4$ | gm./l__ 0.45 |
| Cl | gm./l__ 0.7 |
| Al | gm./l__ 6.6 |
| $SO_4$ | gm./l__ 59.0 |
| pH | 1.7 |

The low quantity of $U_3O_8$ made this solution ideal for the observation of $V_2O_5$ recovery.

Figure 3:
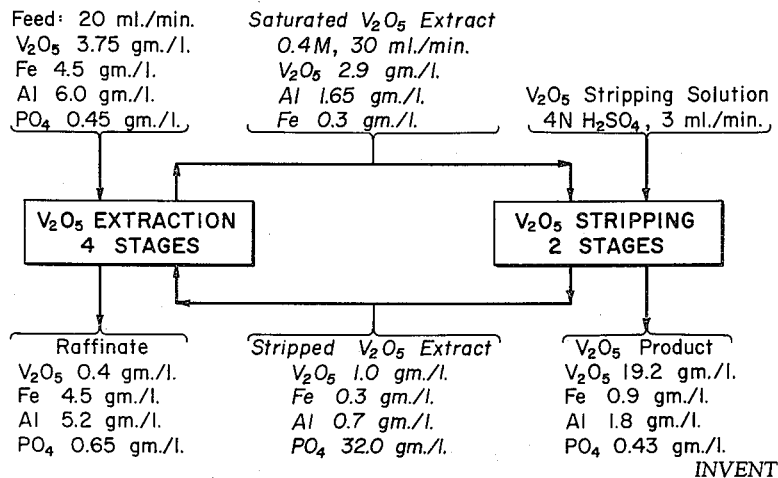
FIGURE 3 is a flow sheet illustrating the continuous countercurrent extraction of vanadium from Lukachukai ore leach solution using nonyl orthophosphoric acid.

0.4 M nonyl phosphoric acid (diisobutyl carbinol o-phosphate) in xylene as the diluent was used to extract vanadium from the leach liquor in the continuous counter-current process illustrated in FIG. 3 of the drawing. Leach liquor, at a feed flow rate of 20 ml./min., was contacted with an organic extractant recycle rate of 30 ml./min. in four successive countercurrent stages resulting in the extraction of the vanadium. The vanadium was in turn stripped from the organic phase in two countercurrent stages with 4 N sulfuric acid flowing at 3 ml./min. and the organic phase was recycled without makeup. The run was continued through approximately 12 cycles of the organic phase with the vanadium extraction initially running to 90% but dropping to 85% at the end of the run due to organic phosphate loss. Calculations showed that the organic phosphate loss was about 0.15 lb. organic phosphate per lb. of $V_2O_5$.

EXAMPLE II

Figure 4:
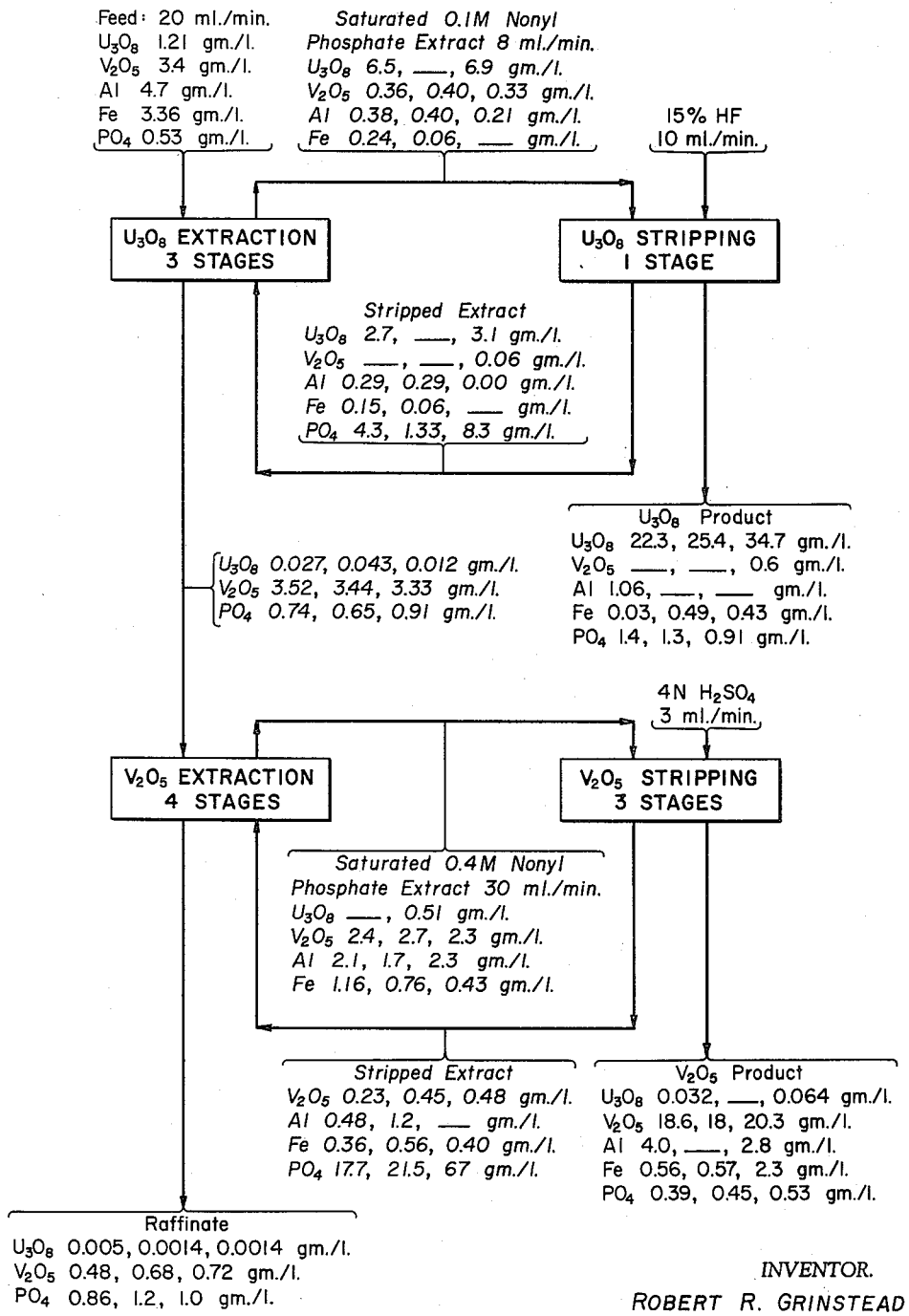
FIGURE 4 is a flow sheet illustrating a continuous process for $U_3O_8$ and $V_2O_5$ recovery from reduced Lukachukai ore leach liquor.

Uranium and vanadium were separately extracted from reduced Lukachukai ore leach liquor (sulfuric acid leach) in a continuous countercurrent mixer-settler system as illustrated in FIG. 4 of the drawing. Uranium was extracted in three extraction stages by contact with nonyl orthophosphoric acid (diisobutyl carbinol derivative) 0.1 M kerosene and then stripped from the extract in a single stage with 15% hydrofluoric acid. The flow rate ratio of leach liquor feed:organic extract:stripping solution in the uranium stages was 20:8:1. The vanadium was subsequently recovered from the leach liquor in four extraction stages with nonyl orthophosphate 0.4 M in kerosene and was stripped from the extract in three stages with 4 N sulfuric acid. The flow rate ratios in the order as given above were 20:30:3.

The feed liquor used in the extraction had a pH of 1.0, a reduced E.M.F. of −0.45 v. (standard calomel electrode vs. Pt) and analyzed:

| | |
|---|---|
| $U_3O_8$ | gm./l__ 1.21 |
| $V_2O_5$ | gm./l__ 3.4 |
| Al | gm./l__ 4.7 |
| Fe | gm./l__ 3.36 |
| $SO_4$ | gm./l__ 47.9 |
| $PO_4$ | gm./l__ 0.53 |
| Cl | gm./l__ 0.10 |

During the run, 30 liters of the feed liquor were treated, corresponding to 12 cycles of the uranium-organic stream. Samples were taken from all solutions of the run during the 5th, 8th, and 12th cycles and analyzed for various constituents. Due to solubility losses of the organic phosphate, both into the feed stream and stripping stream, nonyl orthophosphate make-up was gradually fed into the extractant phase in both the uranium and vanadium stages in sufficient quantity to maintain the initial organic phosphate concentrations. The results of the run demonstrated a uranium recovery of 98% and a vanadium recovery ranging from 80 to 85%.

The process of the present example illustrates one manner in which extraction conditions are regulated to advantageously employ the different relative extract-abilities of different materials so as to selectively extract first one material (U) and later a second (V). The U is effectively extracted from the reduced solution by low concentrations of extractant and at high aqueous to organic phase ratios. The effective extraction of V requires high concentrations of extractant and a low aqueous to organic phase ratio. To accommodate the high concentration of extractant, aromatic solvents or other solvent of high dissolution capacity are sometimes required.

EXAMPLE III

Uranium was recovered from Slick Rock leach liquor (sulfuric acid leach) having the following composition:

$U_3O_8$ _____ gm./l__ 0.65
$V_2O_5$ _____ gm./l__ 4.6
Fe _____ gm./l__ 1.9
Al _____ gm./l__ 4.5
Ti _____ gm./l__ 0.13

Figure 5:
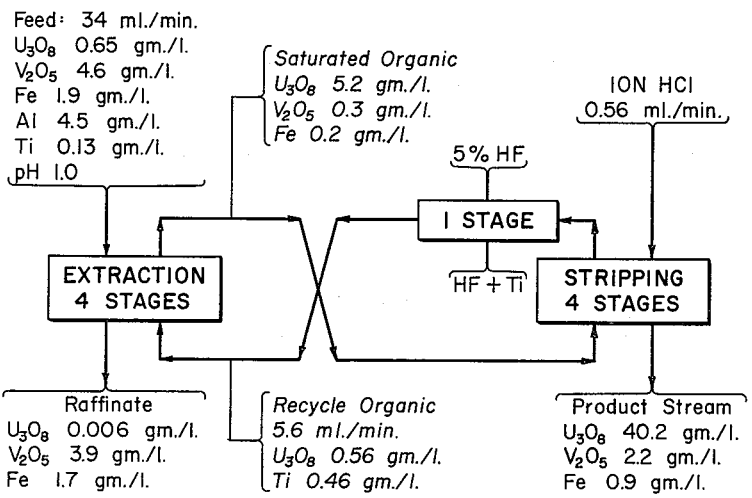
FIGURE 5 is a flow sheet illustrating uranium recovery from reduced Slick Rock leach liquor with 0.1 M dodecyl orthophosphoric acid.

The iron in the leach liquor was reduced to the ferrous state by the addition of sodium thiosulfate until the liquor gave a negative ferric iron test. The uranium was extracted from the feed liquor as illustrated in FIG. 5 of the drawing in four stages of a continuous countercurrent mixer-settler unit by contact with dodecyl orthophosphoric acid, 0.1 M in kerosene. The uranium was then selectively stripped from the DDPA with 10 N hydrochloric acid together with a small proportion of vanadium in four countercurrent stages. Titanium, which tended to build up in the extractant, was stripped therefrom by 5% aqueous hydrofluoric acid in one stripping stage and the extractant recycled. The flow ratio of feed liquor:organic extractant:strip acid was 60:10:1. At the end of 3.7 cycles, 99% of the uranium had been extracted from the feed liquor, and 90 to 95% of the uranium had appeared in the hydrochloric acid stripper solution.

The process of the present example illustrates how the initial extraction conditions may be chosen to selectively extract one material (U) from the solution; however, such conditions also favor extraction of another material (Ti). Therefore, the first material (U) is selectively extracted from the extract and the second material is subsequently removed therefrom by the appropriate choice of stripping conditions.

EXAMPLE IV

The emulsification tendency of various extractants was investigated by shaking the organic and aqueous phases together in a separatory funnel, then allowing the phases to stand and noting the separation time. Two different aqueous phases were selected, a solution containing 50 gm./l. $NA_2SO_4$, and also a carnotite leach liquor (sulfuric acid). The extractants were NPA, DDPA, TDPA, and HDPA, of the character described above, in xylene diluent. For purposes of comparison several orthophosphate esters derived from alcohols containing less than 9 carbon atoms were also included. These were n-octyl, capryl, and 2-ethylhexyl. The phase ratios were 1:1 organic to aqueous. The results are tabulated in the following Table 1.

*Table 1*

EFFECT OF HIGHER ALCOHOLS ON EXTRACTANT EMULSIFICATION

| Ester | Time for Phase Separation | |
|---|---|---|
| | $NA_2SO_4$ Solution | Carnotite Leach Liquor |
| Blank (Xylene) | 40 sec. | |
| n-octyl | 24 hrs.[1] | 24 hrs.[3] |
| capryl | 5 min.[2] | 100 sec. |
| 2-ethylhexyl | 5 min.[2] | 105 sec. |
| nonyl | 60 sec. | 25 sec. |
| dodecyl | 40 sec. | 25 sec. |
| tetradecyl | 70 sec. | 30 sec. |
| heptadecyl | 65 sec. | 40 sec. |

[1] Hot centrifuging for 30 minutes gave partial separation.
[2] After 30 minutes, phases had separated, but both contained emulsions.
[3] Heating on steam bath for 30 minutes did not break the emulsion.

From the data above, it is apparent that branching of the carbon chain and, in fact, a maximum of chain branching in the alkyl substituent is desired to achieve minimum emulsification difficulties in practical process operations. The total number of carbon atoms appears to have a much smaller effect, if any, on the emulsifying tendencies.

EXAMPLE V

Figure 6:
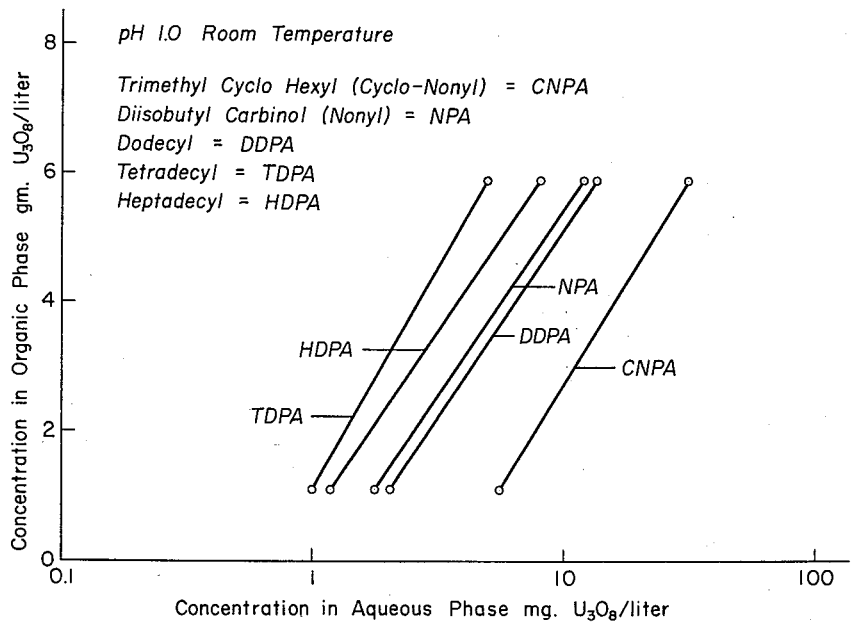
FIGURE 6 is a graphical representation of the distribution of uranium between leach solution and various alkyl orthophosphate esters.

To test the effect of the substituent alkyl group on the extracting ability of various orthophosphates, a series of esters, specifically cyclo-nonyl orthophosphoric acid (trimethyl cyclo-hexyl), nonyl orthophosphoric acid (di-isobutyl carbinol), dodecyl orthophosphoric acid, tetradecyl orthophosphoric acid, and heptadecyl orthophosphoric acid, were contacted with Lukachukai ore leach liquor at two different phase ratios; however, all other conditions, i.e., concentrations, contact times, etc., were maintained constant. The esters were 0.55 M in xylene and the contact time was only a few minutes. From the graphically illustrated results in FIG. 6, it is apparent that, in general, the extractive power increases with an increase in the number of carbon atoms above nine and reaches a maximum at about 14 carbons.

EXAMPLE VI

Utex ore was ground to 30 mesh and uranium recovered therefrom by direct leaching with dodecyl orthophosphoric acid and the addition of 96% sulfuric acid under nonaqueous conditions. The ground ore had the following analysis:

| | Percent |
|---|---|
| $U_3O_8$ | 0.19 |
| $V_2O_5$ | 1.5 |
| $CaCO_3$ | 2.5 |
| Fe | 0.57 |
| Al | 1.5 |
| $PO_4$ | 0.07 |

Twenty-five grams of the ground ore were placed in a 250 ml. flask and mixed with 50 ml. of DDPA, 0.4 M in isopropyl ether. Concentrated sulfuric acid (96%) was added dropwise to the swirling mixture in an amount equivalent to 56 pounds $H_2SO_4$ per ton of ore. The mixture was agitated on a mechanical shaker for 60 minutes. The organic extractant was then separated from the ore by vacuum filtration. Analysis of the extractant revealed that 96.8% of the uranium had been extracted from the ore into the DDPA.

EXAMPLE VII

A uranium extraction isotherm was determined by equilibrating 0.1 M dodecyl orthophosphoric acid in kerosene with Lukachukai leach liquor previously treated with sodium bisulfide to reduce iron present in the leach liquor to the ferrous state, in which state the iron would not compete as strongly for the extractant as in the unreduced solution.

The dodecyl orthophosphoric acid was prepared by slurrying $P_2O_5$ in kerosene and adding trimethyl nonyl alcohol in a 2:1 mole ratio of alcohol to $P_2O_5$. The solution was then refluxed with 2 N hydrochloric acid for 30 minutes to hydrolyze the pyrophosphoric acid esters to the ortho esters. Subsequent to hydrolysis, the solution was diluted to 0.1 M with kerosene.

Figure 7:
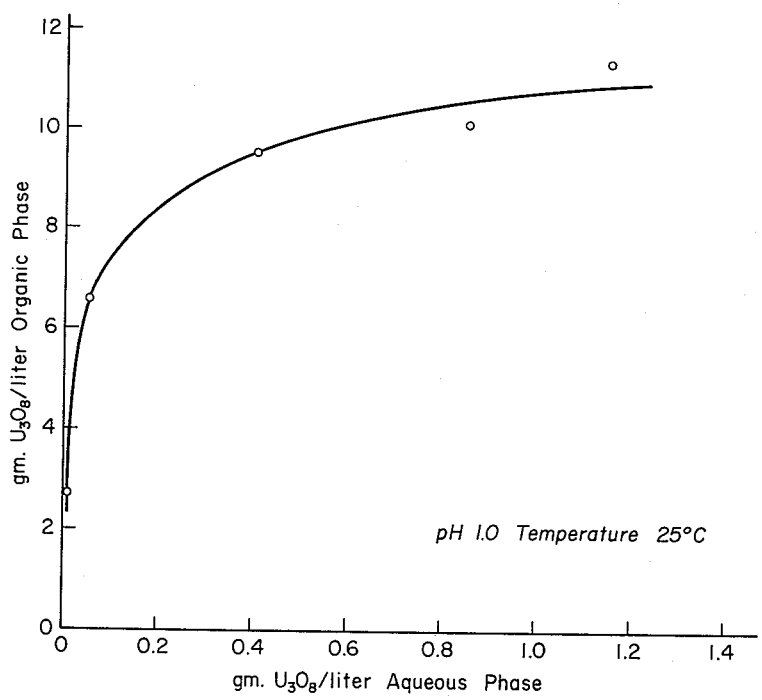
FIGURE 7 is a graphical representation of an isotherm for the distribution of uranium between reduced Lukachukai leach liquor and dodecyl orthophosphoric acid.

The isotherm as shown in FIG. 7 is curved and approaches a saturation value of uranium in organic. The K values, which can be calculated from the illustrated distributions of the uranium, range from about 10 at the higher phase ratios in which the organic is closer to saturation, up to about 200 at the low phase ratios.

EXAMPLE VIII

Caustic leach residue of Florida leach zone ore was leached with concentrated sulfuric acid. The slurry was filtered to yield an acid leach liquor containing the following:

| | Gm./l. |
|---|---|
| $U_3O_8$ | 0.0416 |
| $P_2O_5$ | 4.66 |
| $Al_2O_3$ | 4.30 |
| $SO_4$ | 23.60 |

The distribution of uranium between said acid leach liquor and solutions of the organic extractants, heptadecyl orthophosphoric acid and dodecyl orthophosphoric acid, was then measured by shaking 100 ml. of the acid leach liquor with 10 or 20 ml. of a kerosene solution of either organic ester for five minutes on a mechanical shaker. The phases were allowed to settle in a separatory funnel and subsequently separated. The following Table 2 summarizes the distribution data:

*Table 2*

| Ester | Concentration of Ester, M | Aqueous:Organic Phase Ratio | mg./l. $U_3O_8$ in Org. Phase | $K_D$ |
|---|---|---|---|---|
| HDPA | 0.91 | 5:1 | 243 | 899 |
| HDPA | 0.91 | 10:1 | 387 | 703 |
| HDPA | 0.1 | 5:1 | 221 | 307 |
| HDPA | 0.1 | 10:1 | 373 | 211 |
| HDPA | 0.01 | 10:1 | 199 | 7.91 |
| HDPA | 0.001 | 10:1 | 38.8 | 0.43 |
| DDPA | 0.1 | 10:1 | 415 | 358 |
| DDPA | 0.01 | 10:1 | 249 | 18.7 |
| DDPA | 0.001 | 10:1 | 41.6 | 1.0 |

The above data show that HDPA and DDPA are excellent extractants for uranium from acid leach liquor of the character described.

EXAMPLE IX

Figure 8:
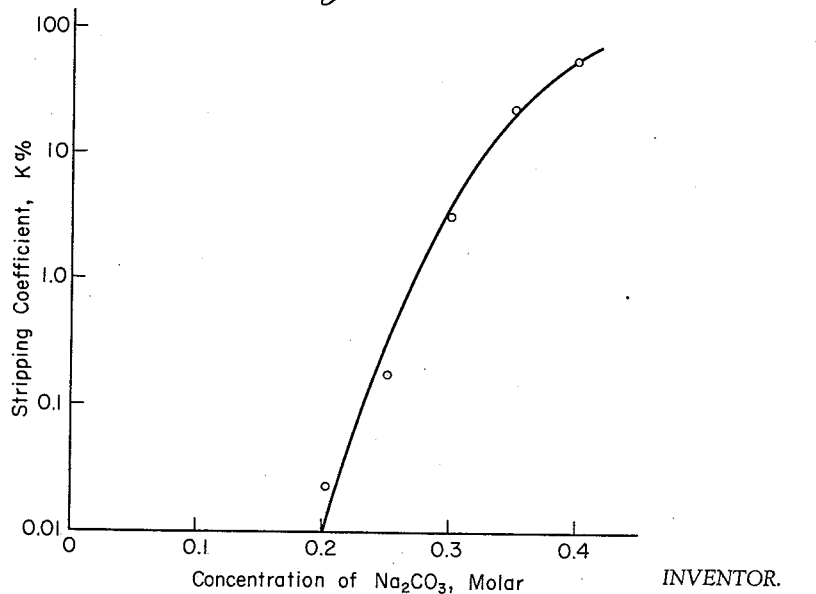
FIGURE 8 is a graphical representation of the stripping of uranium from 0.1 M HDPA in xylene with sodium carbonate solutions.

The ability of sodium carbonate solutions to strip uranium from pregnant alkyl orthophosphates was determined by contacting equal volumes of uranium extracts in extractant phase comprising 0.1 M HDPA in xylene and $Na_2CO_3$ solutions of various concentrations. The $Na_2CO_3$ solutions were then separated and analyzed for uranium content. The stripping coefficients were then plotted versus the $Na_2CO_3$ concentration as shown in FIG. 8. Concentrations of $Na_2CO_3$ in excess of about 0.3 M gave quite high stripping coefficients, indicating that good recovery of uranium can be obtained with carbonate solutions. When kerosene was substituted for xylene as the solvent diluent in the same systems, the physical behavior was about the same. With the carbonate stripping solutions the organic orthophosphate losses were not prohibitive, as most of the extractant dissolved in the aqueous phase could be recovered after acidification of the carbonate strip. The sodium salt of organic phosphate which precipitated in the organic phase dissolved again upon reacidification of the extractant phase.

EXAMPLE X

The efficiency of the hydrochloric and hydrofluoric acid solutions as uranium strippers for use in the present process was illustrated by stripping uranium loaded heptadecyl orthophosphoric acid solutions. The kerosene solution of HDPA was adjusted to 0.1 M concentration of organic phosphate and thereupon contacted with a partially reduced Lukachukai leach liquor solution in a contact ratio of 5:1, aqueous to organic. Through the above equilibration, the HDPA-kerosene solution acquired a uranium content of 5.76 gm. $U_3O_8$ per liter. Two such batches of uranium loaded HDPA solution were prepared, one for hydrochloric acid and the other for hydrofluoric acid stripping.

The first batch was stripped with 8 and 10 M HCl at organic:aqueous ratios varying from 7:1 to 1:1. In addition, several efficiencies were determined at lower uranium concentrations by equilibrating HCl with samples of the loaded HDPA diluted with fresh 0.1 M HDPA in kerosene. The concentration of the diluted samples was 1.44 gm. $U_3O_8$ per liter. The uranium distribution after a two minute shaking time was determined by analyzing portions of each phase, aqueous and organic, after separation. Results of the series of equilibrations are given in the following table:

*Table 3*

| HCl Conc., M | Conc. $U_3O_8$ in Head Org., gm./l. | Phase Ratio, Org./Aq. | K Aq./Org. |
|---|---|---|---|
| 10 | 5.75 | 7.0 | 10.6 |
| 10 | 5.75 | 5.0 | 10.7 |
| 10 | 5.75 | 2.5 | 6.4 |
| 10 | 5.75 | 1.0 | 3.8 |
| 10 | 5.75 | 0.5 | 2.5 |
| 10 | 1.44 | 5.0 | 4.2 |
| 10 | 1.44 | 2.5 | 3.9 |
| 10 | 1.44 | 1.0 | 2.1 |
| 10 | 1.44 | 0.5 | 1.6 |
| 8 | 5.75 | 7.0 | 4.3 |
| 8 | 5.75 | 5.0 | 3.7 |
| 8 | 5.75 | 2.5 | 2.2 |
| 8 | 5.75 | 1.0 | 1.0 |
| 8 | 5.75 | 0.5 | 0.7 |
| 8 | 1.44 | 5.0 | 1.6 |
| 8 | 1.44 | 2.5 | 1.2 |
| 8 | 1.44 | 1.0 | 1.1 |
| 8 | 1.44 | 0.5 | 0.8 |

In a similar manner, uranium loaded HDPA-kerosene solutions were stripped by 10, 15, and 20% hydrofluoric acid solutions. However, all equilibrations were carried out in polyethylene containers, while the organic to aqueous phase ratio was varied from 7:1 to ½:1. After 2 minutes shaking time, the aqueous HF phase was removed, weighed, and diluted to a known volume, while the organic phase was washed with 3 N $H_2SO_4$ to remove entrained HF. Each phase was then analyzed for uranium content. The results are given in the following Table 4:

*Table 4*

| HF Conc., Weight Percent | Phase Ratio, Org./Aq. | K Aq./Org. |
|---|---|---|
| 20 | 6.77 | 14.5 |
| 20 | 5.15 | 13.8 |
| 20 | 2.61 | 9.2 |
| 20 | 1.04 | 4.9 |
| 20 | 0.48 | 5.5 |
| 15 | 7.78 | 10.6 |
| 15 | 5.20 | 8.6 |
| 15 | 2.36 | 5.8 |
| 15 | 1.00 | 3.2 |
| 15 | 0.54 | 2.1 |
| 10 | 5.48 | 5.9 |
| 10 | 4.27 | 5.7 |
| 10 | 2.53 | 3.9 |
| 10 | 1.02 | 2.1 |
| 10 | 0.52 | 1.4 |

As can be seen in the above Tables 3 and 4, 20% hydrofluoric acid shows the most efficient stripping of uranium (VI) from 0.1 M HDPA in kerosene. However, 15% hydrofluoric acid and 10 M hydrochloric acid could also be used advantageously, both strippers being nearly equal in effectiveness.

EXAMPLE XI

The stability of the subject organic orthophosphates in the presence of acid stripping solutions was determined by contacting said orthophosphates with strong sulfuric acid stripping solutions for long periods of time, removing like samples of each phase at various intervals throughout said contact time, and analyzing the samples for phosphate content. Specifically, 100 ml. of a 0.4 M solution of heptadecyl orthophosphoric acid in kerosene and 100 ml. of 0.4 M solution of dodecyl orthophosphoric acid in kerosene were contacted witd equal volumes of 9 N sulfuric acid in separate shaker flasks. At various times, the phases were separated and a 10 ml. sample was removed from each phase so that the phase ratios remained the same. The aqueous samples were then analyzed for phosphate. The results are shown in the following Table 5:

Table 5

| Time of Shaking | 0.4 M HDPA with 9 N $H_2SO_4$ mg. $PO_4$/l. in Aqueous | 0.4 M DDPA with 9 N $H_2SO_4$ mg. $PO_4$/l. in Aq. |
| --- | --- | --- |
| 1 min | 221 | 38 |
| 5 hours | 240 | 49 |
| 21 hours | 198 | 15 |
| 4 days | 268 | 18 |
| 11 days | 200 | 33 |

It is evident from the above data showing a nearly constant phosphate level for both HDPA and DDPA that neither organic phosphate undergoes hydrolysis in 9 N $H_2SO_4$ for long contact times, and that in general, it is concluded that the organic phosphate extractants of the invention are very stable compounds in the presence of acid strippers.

EXAMPLE XII

Four six gallon batches of 1:1 M DDPA were prepared using the following quantities in each batch:

$P_2O_5$ _____ pounds __ 3.75
2,6,8-trimethylnonanol-4 _____ do ____ 10.2
Kerosene _____ gallons __ 4.0

The $P_2O_5$ was added to the kerosene in a reaction vessel and slurried therein for five minutes. The dodecyl alcohol was then rapidly added while agitating the reaction mixture. With the reaction taking place exothermically, the reaction temperature increased to a maximum of 59° C. within ten minutes. After 30 minutes the reaction temperature had receded to 49° C. Agitation was stopped and the reaction mixture transferred to another vessel for hydrolysis.

The above reaction yielded 5.67 gallons of unhydrolyzed phosphate ester which was approximately 1.1 N in strong acid. Three grams of residue remained, indicating a 99.8% conversion of phosphorus pentoxide.

The initial reaction mixture was then hydrolyzed with an equal volume of 1 M HCl while being agitated. The hydrolysis temperature varied between 60° and 70° C. At this temperature hydrolysis was complete in 4½ hours, with the resultant dodecyl orthophosphoric acid 0.9 M in kerosene. Analyses of the aqueous HCl after hydrolysis indicated that about 23% of the $PO_4^\equiv$ involved had been lost into the aqueous phase during the hydrolysis. The resultant overall yield of DDPA was 77%.

As a control on the progress of the hydrolysis, small samples were taken at various time intervals and titrated with sodium hydroxide in the presence of a 50% acetone-50% water solution. Prior to the hydrolysis step, little weak acid is present; however, as the hydrolysis proceeds, an increase in the weak acid occurs and finally, when hydrolysis is complete, the weak acid is equal to the strong acid.

After the completion of the hydrolysis, the DDPA batches were separated from the aqueous phase, combined with one another, and diluted with more kerosene to supply 196 gallons of 0.1 N extractant.

Two additional preparations similar to the above were carried out, but the hydrolysis was made in Pfaudler kettles equipped with water cooled reflux condensers. The latter enabled the hydrolysis to be carried out at a higher temperature of 90° to 95° C. Under these conditions only 1½ hours were used for hydrolysis and the resulting overall yield was 86%. By these means two 35 gallon batches of 0.85 to 0.90 N DDPA were prepared.

EXAMPLE XIII 0.1 mol of phosphorus pentoxide were slurried with 100 mls. of kerosene in a reaction flask equipped with a suitable stirring and cooling means and a reflux condenser. While stirring the slurry vigorously, 1.6 moles of 3,9-diethyltridecanol-6 were added rapidly. Reaction between the alcohol and $P_2O_5$ took place, the reaction mixture attaining a maximum temperature of 56° C. When all of the alcohol had reacted with the $P_2O_5$, an equal volume of 1 N HCl was added to the reaction mixture, heat was applied, and the solution refluxed for 2 hours. The final hydrolysis product was predominantly monoheptadecyl orthophosphoric acid. In this reaction 97.7% of the heptadecanol was converted to the orthophosphate ester, and the yield of total orthophosphate ester calculated from the alcohol added was 80.1%.

While in the foregoing specification there have been described what may be considered to be preferred embodiments of the invention, modifications may be made therein without departing from the spirit of the invention, and it is intended to cover all such as fall within the scope of the appended claims.

What is claimed is:

1. In a process for producing alkyl orthophosphoric acid extractants, the steps comprising slurrying phosphorus pentoxide in a solvent-diluent selected from the group consisting of aliphatic hydrocarbons, aromatic hydrocarbons, halogenated hydrocarbons, ethers, and petroleum solvents, then adding to said slurry an aliphatic alcohol having from 9 to 17 carbon atoms and in which the OH group is situated inward of the terminal carbon atoms while maintaining a reaction temperature below about 60° C., and wherein the mole ratio of alcohol to $P_2O_5$ is about 2:1, thereby forming a pyrophosphate reaction product in said solvent, hydrolyzing said reaction product with dilute mineral acid to produce said alkyl orthophosphoric acid ester in said solvent, and separating the solution of extractant from said acid.

2. The process of claim 1 wherein said aliphatic alcohol is 2,6-dimethyl heptanol-4.

3. The process of claim 1 wherein said aliphatic alcohol is 2,6,8-trimethyl nonanol-4.

4. The process of claim 1 wherein said aliphatic alcohol is 2-methyl-7-ethyl decanol-4.

5. The process of claim 1 wherein said aliphatic alcohol is 2-methyl-7-ethyl undecanol-4.

6. The process of claim 1 wherein said aliphatic alcohol is 3,9-diethyl-tridecanol-6.

7. The process of claim 1 wherein said solvent-diluent is kerosene.

8. The process of claim 1 wherein said solvent-diluent is benzene.

9. The process of claim 1 wherein said solvent-diluent is isopropyl ether.

10. The process of claim 1 wherein said solvent-diluent is xylene.

References Cited in the file of this patent

UNITED STATES PATENTS

| 2,716,657 | Bretschneider | Aug. 30, 1955 |
| 2,831,782 | Zvanut | Apr. 22, 1958 |
| 2,849,281 | McCullough | Aug. 26, 1958 |
| 2,902,454 | Moore | Sept. 1, 1959 |